Patented June 17, 1930

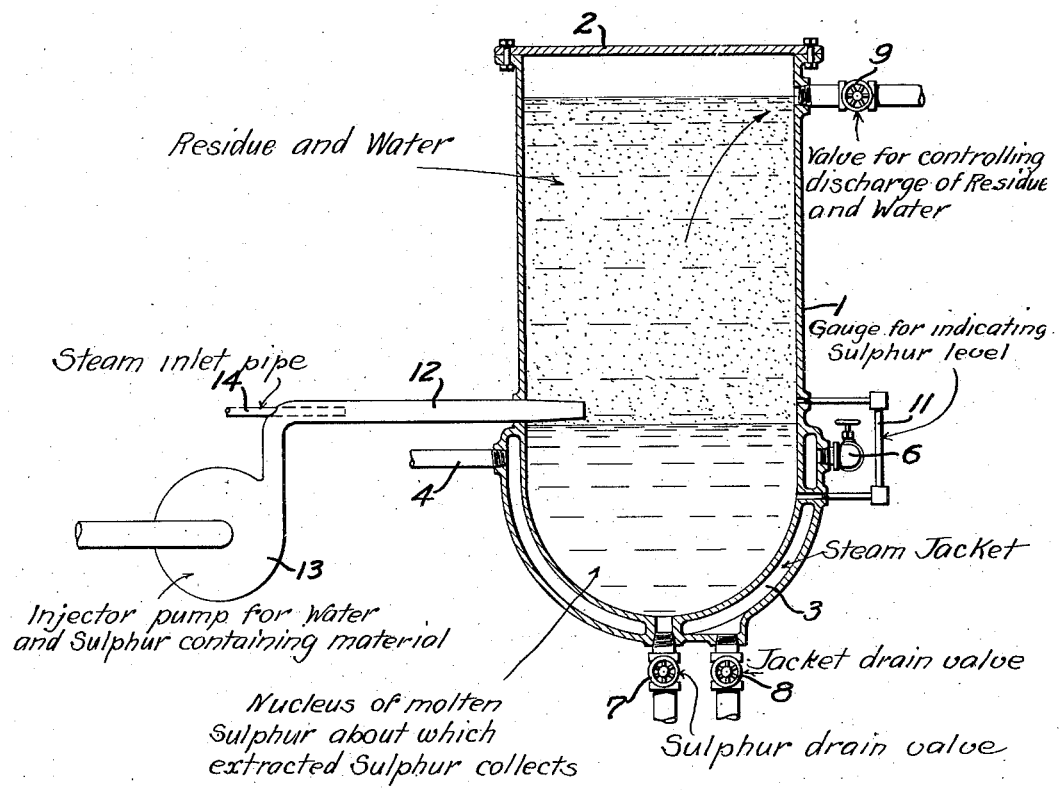

1,763,762

UNITED STATES PATENT OFFICE

ARTHUR J. CROWLEY, OF SULPHUR, NEVADA, ASSIGNOR TO HUMBOLDT SULPHUR COMPANY, OF SULPHUR, NEVADA, A CORPORATION OF DELAWARE

METHOD OF EXTRACTING SULPHUR

Application filed July 6, 1927. Serial No. 203,799.

My invention relates to a method and apparatus for extracting sulphur from a sulphur containing material, such as sulphur ore, in which the sulphur is mechanically enclosed, and the broad object of my invention is to extract the sulphur containing material by means of a liquid heated to a high temperature.

Another object of the invention is to extract the sulphur by a continuous process.

Another object of the invention is to extract the sulphur in such a manner as to separate it from the residue which is left in the sulphur containing material after the sulphur is melted therefrom, and during the process of extraction.

Another object of the invention is to provide a bath of molten sulphur as a nucleus about which the molten sulphur may be collected.

Other objects of the invention, together with the foregoing, will be set forth in the following description of my preferred embodiment of means for practicing my invention and which is illustrated in the drawings accompanying and forming part of the specification. It is to be understood that I do not limit myself to the showing made by the said description and drawing, as I may adopt variations of my preferred form within the scope of my invention as set forth in the claims.

Referring to the drawings:

The figure is a vertical sectional view, partly in elevation, of the apparatus for carrying out my invention.

In a mixture of sulphur ore residue, superheated water and molten sulphur, the water will wet the ore residue, while the molten sulphur will not be attracted thereto but will collect in globules and due to the strong intermolecular attraction between the globules, they will tend to collect in a mass. The above phenomenon is facilitated by having a mass of molten sulphur as a nucleus, about which the globules can collect. This physical property is taken advantage of in my process.

It has also been found that, in the presence of superheated water, molten sulphur has the property of supporting, on its surface, materials of greater specific gravity than the sulphur. Although this phenomenon is hard to explain, it is probably due to the surface tension of the sulphur and its great intermolecular attraction. Using the grade of sulphur ore found in Humboldt County, Nevada, a mass of molten sulphur, under the above recited conditions, will support a residue, resulting from the extraction of sulphur from sulphur ore, to a depth of four inches above its surface. Of course, the volume of residue supported by the mass will be different for different types of ores, depending on their various specific gravities. This property is also taken advantage of in my process.

In terms of broad inclusion, my invention comprises a chamber into which a pipe projects at a point near the bottom thereof. A mass or nucleus of molten sulphur, in the bottom, is maintained at such a level below the projecting pipe, that the distance between its surface and the point at which the pipe projects into the chamber is slightly less than the maximum depth of residue, that the sulphur can support. This distance will vary with different types of ores, but with the ore used in the present process, it is about four inches. In order to maintain the proper level, an outlet valve in the bottom of the chamber is automatically opened or shut as the level of sulphur rises or falls. Various mechanical or electrical means may be used to perform this operation, such as a float which, as it rises and falls, opens and closes various circuits which control operating means for adjusting the valve. If desired, the valve may be manually controlled, and the level of the sulphur may be determined by means of a gauge outside the chamber. In order to prevent solidification of the molten sulphur, a steam jacket or any other heating means, surrounds the bottom of the chamber. Near the top thereof is a control valve, which controls the rate of flow of water therethrough.

When sulphur ore, water and steam are forced into the pipe, which projects into the chamber, the steam superheats the water thus melting the sulphur from the ore. As the mixture flows into the chamber, the molten sulphur collects and sinks to the bottom and forms a nucleus about which more molten sulphur can collect, while the superheated water which flows, due to the velocity imparted to it by the mixture forced into the chamber, carries the residue thru the control valve and out of the chamber. As described the sulphur will support a certain amount of residue, hence it can be seen that if the flow of water is rapid enough it will carry the residue out of the chamber while the sulphur will separate and collect about the nucleus. When the process is first started, it may not operate as efficiently as when the level of sulphur is just below the injector pipe, and the superheated water is up to the level of the control valve. As soon as these conditions are obtained, the process may be carried on continuously. It is sometimes desirable to start the process, with the chamber containing the nucleus of sulphur and superheated water, and then continue from that point, as previously described.

In detail, my apparatus comprises the chamber 1 having a removable head 2, and steam jacket 3, around the bottom thereof. Into the jacket lead the usual steam inlet pipe 4, and outlet pipe 6. A sulphur drain valve 7 is located in the bottom of the chamber, while a drain valve 8 is located in the bottom of the steam jacket. Near the top of the chamber is the control valve 9 which is adjusted to balance the pressure and velocity of the superheated water, so as to maintain the proper temperature; and to cause the water to carry with it the residue without the particles of sulphur, while on the side is the gauge 11, which indicates the level of the sulphur and water. Leading into the chamber is the extractor pipe 12, thru which water and sulphur containing material are forced by means of pump 13 or by any other means, such as gravity. Steam inlet pipe 14, projects into pipe 12, and the steam admitted therein superheats the water which melts the sulphur from the sulphur containing material.

As previously described it is important that the level of the sulphur is maintained below that of pipe 12 and sufficiently high to prevent the residue, which might fall on the surface of the sulphur, from breaking through. If the level of the sulphur rises, due to the accumulation of molten sulphur in the bottom of the chamber, valve 7 automatically opens, by means of any conventional mechanical or electrical arrangement which is controlled by the rise and fall of the level, so as to allow sulphur to flow from the chamber, and closes when the level falls too low. However, this valve may be operated by hand if so desired.

The sulphur produced by the method and apparatus of the present invention is practically 100% pure.

I claim:

1. A process of extracting sulphur which comprises subjecting a mass of sulphur containing material to superheated water to melt the sulphur therefrom, and forcing the resulting mixture into a flow of superheated water resting on a mass of molten sulphur.

2. A process of extracting sulphur which comprises subjecting a mass of sulphur containing material to superheated water to melt the sulphur therefrom; and forcing the resulting mixture into a flow of superheated water resting on a mass of molten sulphur, the direction of flow being away from the surface of the molten sulphur.

3. A process of extracting sulphur which comprises subjecting a mass of sulphur containing material to superheated water to melt the sulphur therefrom, forcing the resulting mixture into superheated water which flows away from the surface of the molten sulphur, and controlling the rate of flow of the water.

4. A process of extracting sulphur which comprises subjecting a mass of sulphur containing material to superheated water to melt the sulphur therefrom, forcing the resulting mixture into a flow of superheated water resting on a mass of molten sulphur, and controlling the level of the molten sulphur.

5. A process of extracting sulphur which comprises subjecting a mass of sulphur containing material to superheated water to melt the sulphur therefrom, forcing the resulting mixture into a flow of superheated water resting on a mass of molten sulphur, controlling the rate of flow of the water, and controlling the level of the molten sulphur.

6. A process of extracting sulphur which comprises subjecting a mass of sulphur containing material to superheated water to melt the sulphur therefrom; forcing the resulting mixture into a flow of superheated water resting on a mass of molten sulphur; and maintaining the level of the molten sulphur at a point above which any residue, in the sulphur containing material left after the melting of the sulphur, which tends to fall on the mass of molten sulphur, will not break thru the surface thereof.

7. A process of extracting sulphur which comprises subjecting a mass of sulphur containing material to superheated water to melt the sulphur therefrom, forcing the resulting mixture into a flow of superheated water resting on a mass of molten sulphur, and maintaining the surface level of the molten sulphur at a point within four inches of the point at which the mixture is forced into the superheated water.

8. A process of extracting sulphur which comprises subjecting a mass of sulphur containing material to superheated water to melt the sulphur therefrom, and passing the resulting mixture into superheated water resting on a mass of molten sulphur.

9. A process of extracting sulphur which comprises subjecting a mass of sulphur containing material to superheated water to melt the sulphur therefrom, and subjecting the resulting mixture to contact with the surface only of a mass of molten sulphur.

In testimony whereof, I have hereunto set my hand.

ARTHUR J. CROWLEY.